United States Patent
Suzuki et al.

(10) Patent No.: US 9,780,577 B2
(45) Date of Patent: Oct. 3, 2017

(54) ELECTRIC POWER SUPPLY CONTROL DEVICE AND ELECTRIC POWER SUPPLY CONTROL METHOD

(71) Applicant: TOYOTA JIDOSHA KABUSHIKI KAISHA, Toyota-shi, Aichi-ken (JP)

(72) Inventors: Takeaki Suzuki, Susono (JP); Masaki Matsunaga, Odawara (JP); Kazuhito Eshima, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 237 days.

(21) Appl. No.: 14/711,046

(22) Filed: May 13, 2015

(65) Prior Publication Data

US 2015/0340884 A1 Nov. 26, 2015

(30) Foreign Application Priority Data

May 26, 2014 (JP) .................. 2014-108133

(51) Int. Cl.
*H02J 7/00* (2006.01)
*H02J 7/14* (2006.01)
(Continued)

(52) U.S. Cl.
CPC .............. *H02J 7/0013* (2013.01); *B60L 7/12* (2013.01); *B60L 11/14* (2013.01);
(Continued)

(58) Field of Classification Search
USPC ................ 320/107, 104, 116, 118, 124, 134
See application file for complete search history.

(56) References Cited

U.S. PATENT DOCUMENTS 8,441,228 B2 * 5/2013 Brabec ................ B60L 11/1861
180/65.21
2010/0134065 A1 * 6/2010 Iida ........................ B60L 3/04
320/103
(Continued)

FOREIGN PATENT DOCUMENTS

DE 4028242 A1 3/1992
DE 102011109709 A1 2/2013
(Continued)

*Primary Examiner* — Brian Ngo
(74) *Attorney, Agent, or Firm* — Sughrue Mion, PLLC

(57) ABSTRACT

Provided is an electric power supply control device for an electric power supply apparatus including a plurality of storage batteries and an electric power generator performing charging of the plurality of storage batteries, the electric power supply control device controlling a parallel connection between the plurality of storage batteries. Voltage adjustment by one of a) charging processing by electric power feeding from the electric power generator to the storage battery having the lowest output voltage among the plurality of storage batteries and b) discharging processing by electric power feeding from the storage battery having the highest output voltage among the plurality of storage batteries to a load circuit connected to the storage battery having the highest output voltage is performed. Parallel connection is performed in a case where output voltage difference between the plurality of storage batteries becomes equal to or less than a previously-determined threshold.

7 Claims, 10 Drawing Sheets

(51) Int. Cl.
*H02J 7/34* (2006.01)
*B60L 7/12* (2006.01)
*B60L 11/14* (2006.01)
*B60L 11/18* (2006.01)
*B60L 15/20* (2006.01)

(52) U.S. Cl.
CPC ....... *B60L 11/1861* (2013.01); *B60L 11/1868* (2013.01); *B60L 15/20* (2013.01); *H02J 7/1423* (2013.01); *H02J 7/34* (2013.01); *B60L 2210/10* (2013.01); *B60L 2240/421* (2013.01); *B60L 2240/441* (2013.01); *B60L 2240/547* (2013.01); *B60L 2240/549* (2013.01); *B60L 2260/26* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7275* (2013.01)

(56) References Cited

U.S. PATENT DOCUMENTS

| | | | |
|---|---|---|---|
| 2013/0021000 A1* | 1/2013 | Kuraishi | H02J 7/0016 320/118 |
| 2014/0091767 A1* | 4/2014 | Tamura | B60R 16/033 320/126 |
| 2014/0111122 A1* | 4/2014 | Kawashima | H02J 7/0029 318/139 |
| 2015/0035356 A1 | 2/2015 | Sakata | |
| 2015/0329007 A1* | 11/2015 | Matsunaga | H01M 10/0525 320/126 |

FOREIGN PATENT DOCUMENTS

| | | |
|---|---|---|
| JP | 2002-369400 A | 12/2002 |
| JP | 2011-176958 A | 9/2011 |
| JP | 2013-055853 A | 3/2013 |
| WO | 2011/158086 A2 | 12/2011 |
| WO | 2013141196 A1 | 9/2013 |

* cited by examiner

⟨WHEN VEHICLE IS LEFT UNATTENDED⟩

⟨DURING FUEL ELECTRIC POWER GENERATION STOP, DURING IDLE REDUCTION⟩

⟨DURING RESTART AFTER IDLE REDUCTION⟩

⟨DURING DECELERATION REGENERATION⟩

⟨DURING SOC RECOVERY CONTROL
(FUEL ELECTRIC POWER GENERATION)⟩

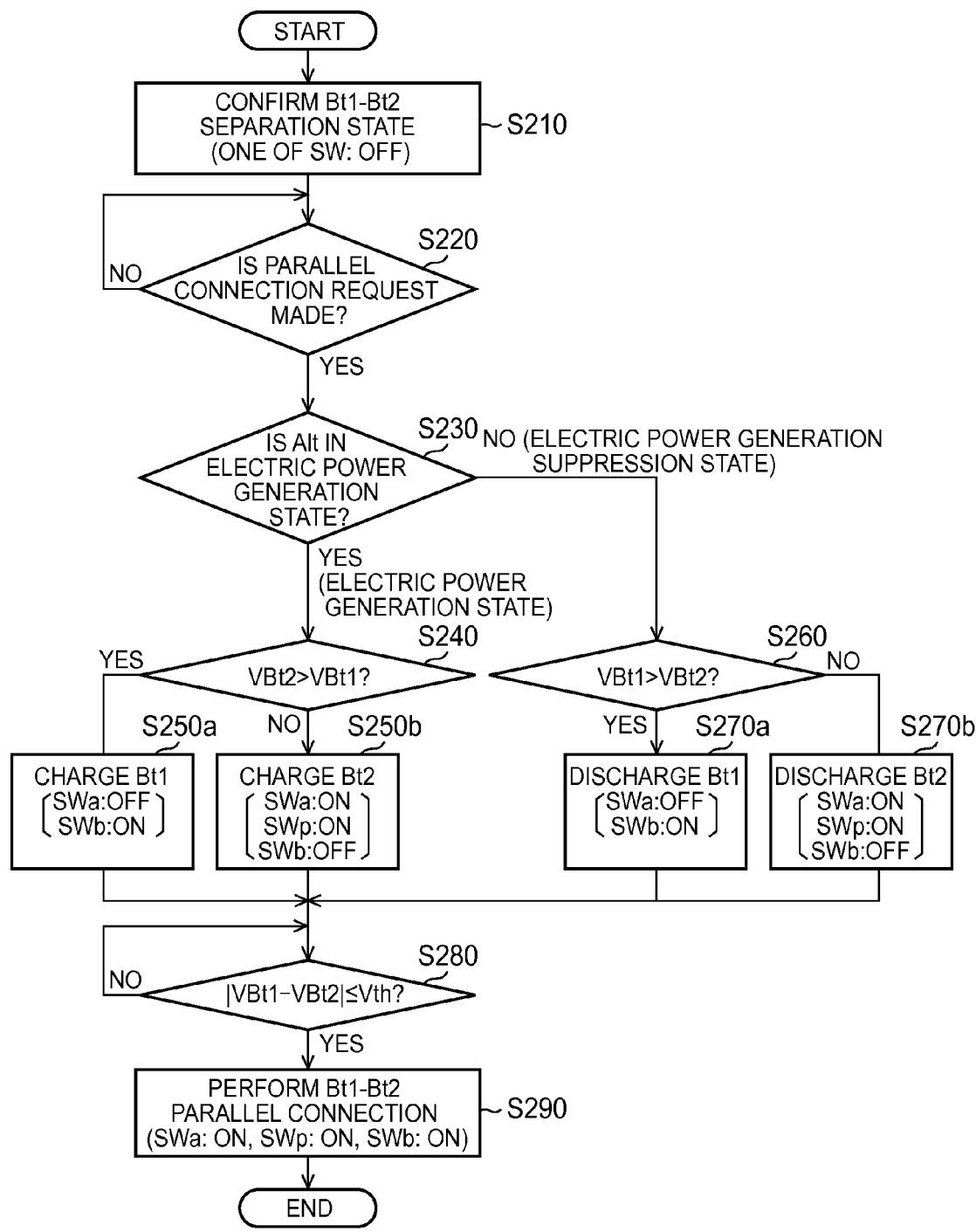

ELECTRIC POWER SUPPLY CONTROL DEVICE AND ELECTRIC POWER SUPPLY CONTROL METHOD

INCORPORATION BY REFERENCE

The disclosure of Japanese Patent Application No. 2014-108133 filed on May 26, 2014 including the specification, drawings and abstract is incorporated herein by reference in its entirety.

BACKGROUND OF THE INVENTION

1. Field of the Invention

The invention relates to controlling an electric power supply apparatus that includes a plurality of electric power supplies.

2. Description of Related Art

Japanese Patent Application Publication No. 2013-055853 discloses an electric power supply control device that connects two electric power storage devices in parallel to each other via a converter executing bidirectional DC voltage conversion. The converter converts a DC voltage in such a manner that the voltage difference between the two electric power storage devices falls within a predetermined range, and thus the electric energy loss is suppressed which results from the generation of a current from the high-voltage electric power storage device to the low-voltage electric power storage device.

However, the configuration using the converter is complex in configuration and uses an increased number of components, which leads to higher costs. This configuration is insufficient in terms of apparatus structural simplification, size reduction, and cost reduction, and thus improvement is desired.

SUMMARY OF THE INVENTION

An aspect of the invention can be realized in the following form.

According to the aspect of the invention, there is provided an electric power supply control device for an electric power supply apparatus including a plurality of storage batteries and an electric power generator performing charging of the plurality of storage batteries. The electric power supply control device controls a parallel connection between the plurality of storage batteries. The electric power supply control device includes a voltage comparison unit performing comparison between output voltages of the plurality of storage batteries; a voltage adjustment unit performing voltage adjustment by one of a) charging processing by electric power feeding from the electric power generator to the storage battery having the lowest output voltage among the plurality of storage batteries subject to the comparison by the voltage comparison unit and b) discharging processing by electric power feeding from the storage battery having the highest output voltage among the plurality of storage batteries subject to the comparison by the voltage comparison unit to a load circuit connected to the storage battery having the highest output voltage; and a connection processing unit performing the parallel connection in a case where output voltage difference between the plurality of storage batteries becomes equal to or less than a previously-determined threshold as a result of the voltage adjustment by the voltage adjustment unit. According to this aspect, the parallel connection can be performed by adjusting the output voltage difference between the plurality of storage batteries to become equal to or less than the threshold. In this manner, it is possible to perform the parallel connection while suppressing electric energy loss and voltage variation with ease and without using any converter according to the related art, and thus the apparatus can become simplified, compact, and inexpensive.

In the aspect described above, the electric power supply apparatus may include the electric power generator, a first storage battery connected, directly or via a first connection switch, to a first electric power supply line to which a first auxiliary machine group is connected and a second storage battery connected, via a second connection switch, to a second electric power supply line to which a second auxiliary machine group is connected, and the first electric power supply line and the second electric power supply line may be connected to each other via a third connection switch. According to this aspect, the respective storage batteries can be connected to the electric power generator and can be connected in parallel to each other by the opening and closing of the connection switch.

In the aspect described above, the first storage battery may be connected, via the first connection switch, to the first electric power supply line to which the first auxiliary machine group is connected.

In the aspect described above, the voltage comparison unit may perform the comparison between the output voltages of the plurality of storage batteries in a case where an execution request for the parallel connection is made, the voltage adjustment unit may perform the voltage adjustment based on the result of the comparison, and the connection processing unit may control the parallel connection based on the result of the voltage adjustment. According to this aspect, the parallel connection can be performed by performing the voltage adjustment on the plurality of storage batteries based on the request for the parallel connection.

In the aspect described above, the voltage comparison unit may perform the comparison between the output voltages of the plurality of storage batteries, the voltage adjustment unit may perform the voltage adjustment based on the result of the comparison, and the connection processing unit may control the parallel connection based on the result of the voltage adjustment in a case where an execution request for the parallel connection is made after the voltage adjustment.

In the aspect described above, the voltage adjustment unit may perform the voltage adjustment by the charging processing when the electric power generator is in an electric power generation state and the voltage adjustment unit may perform the voltage adjustment by the discharging processing when the electric power generator is in a non-electric power generation state. According to this aspect, the parallel connection can be performed by performing the voltage adjustment so that the output voltage difference between the plurality of storage batteries becomes equal to or less than the threshold in accordance with the state of the electric power generator.

In the aspect described above, the plurality of storage batteries may include a first storage battery directly connected to the electric power generator and a second storage battery connected in parallel to the first storage battery via a connection switch. The voltage adjustment unit may perform the voltage adjustment by the charging processing for the first storage battery with the electric power generator in the electric power generation state in a case where the output voltage of the second storage battery exceeds the output voltage of the first storage battery, and the voltage adjustment unit may perform the voltage adjustment by the discharging processing for the first storage battery with the electric power generator in the non-electric power generation state in a case where the output voltage of the first storage battery exceeds the output voltage of the second storage battery. The connection processing unit may perform the parallel connection between the first storage battery and the second storage battery by closing the connection switch in a case where the output voltage difference between the first storage battery and the second storage battery becomes equal to or less than the threshold. According to this aspect, the voltage adjustment can be performed by the charging processing for the first storage battery with the electric power generator in the electric power generation state in a case where the output voltage of the second storage battery exceeds the output voltage of the first storage battery and the voltage adjustment can be performed by the discharging processing for the first storage battery with the electric power generator in the non-electric power generation state in a case where the output voltage of the first storage battery exceeds the output voltage of the second storage battery. In a case where the output voltage difference between the first storage battery and the second storage battery becomes equal to or less than the threshold, the parallel connection between the first storage battery and the second storage battery can be performed by closing the connection switch.

In the aspect described above, the voltage adjustment unit may perform the voltage adjustment by the charging processing for the first storage battery by changing the state of the electric power generator into the electric power generation state when the electric power generator is in the non-electric power generation state in a case where the output voltage of the second storage battery exceeds the output voltage of the first storage battery, and the voltage adjustment unit may perform the voltage adjustment by the discharging processing for the first storage battery by changing the state of the electric power generator into the non-electric power generation state when the electric power generator is in the electric power generation state in a case where the output voltage of the first storage battery exceeds the output voltage of the second storage battery. According to this aspect, the state of the electric power generator can be changed into the electric power generation state, instead of waiting for a change into the electric power generation state, when the electric power generator is in the non-electric power generation state in a case where the output voltage of the second storage battery exceeds the output voltage of the first storage battery, and thus the charging processing for the first storage battery with the electric power generator can be immediately performed and the voltage adjustment can be performed. Also, according to this aspect, the state of the electric power generator can be changed into the non-electric power generation state, instead of waiting for a change into the non-electric power generation state, when the electric power generator is in the electric power generation state in a case where the output voltage of the first storage battery exceeds the output voltage of the second storage battery, and thus the discharging of the first storage battery can be immediately performed and the voltage adjustment can be performed.

The invention can be realized in various forms other than the above as well. For example, the invention can be realized in the form of an electric power supply apparatus that is provided with an electric power supply control device, a vehicle on which an electric power supply apparatus is mounted, an electric power supply control method, a program for realizing an electric power supply control method, a non-temporary storage medium that stores the program, and the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a flowchart illustrating the control of a parallel connection according to the fourth embodiment that is executed by an electric power supply control unit.

DETAILED DESCRIPTION OF EMBODIMENTS

A. First Embodiment

Figure 1:
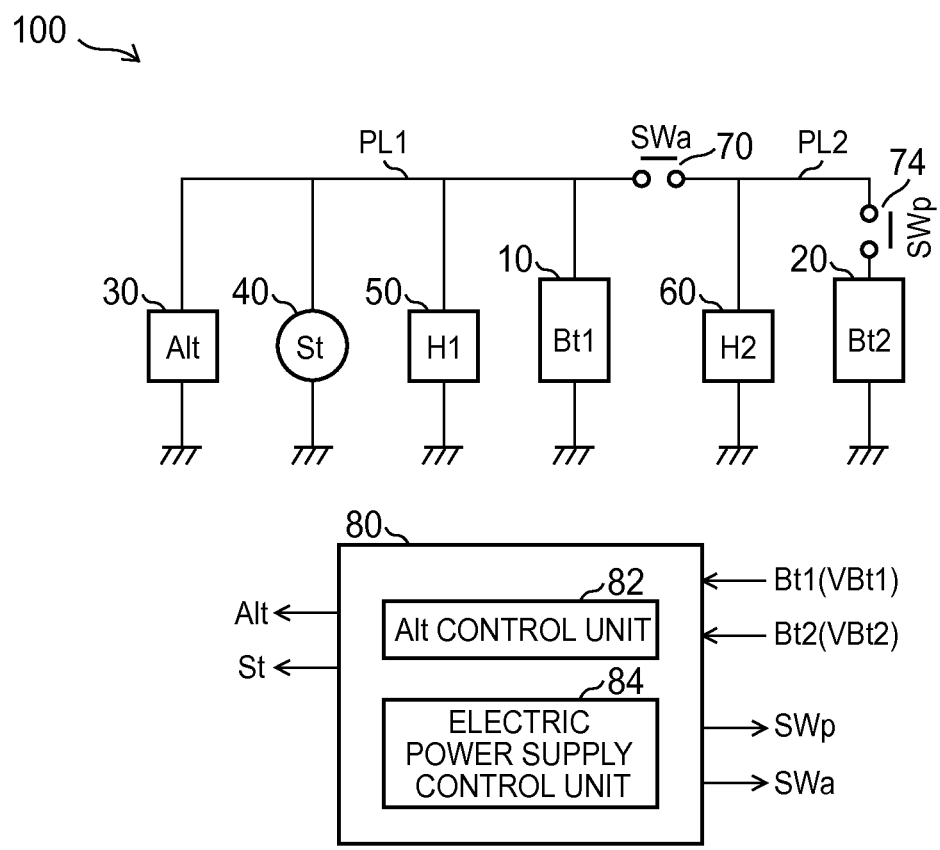
FIG. 1 is an explanatory diagram illustrating a schematic configuration of an electric power supply apparatus according to a first embodiment.

FIG. 1 is an explanatory diagram illustrating a schematic configuration of an electric power supply apparatus 100 according to a first embodiment. The electric power supply apparatus 100 is, for example, an electric power supply apparatus that is mounted on a car. The car according to this embodiment is, for example, a gasoline vehicle that uses a gasoline engine as a power source, in which idle reduction and charging by the torque that is generated by the engine and regeneration during deceleration (regenerative braking) are carried out. The idle reduction means stopping the engine when the car is stopped and restarting the engine before traveling initiation.

The electric power supply apparatus 100 is provided with a first battery 10 and a second battery 20 as 12 V electric power supplies, a connection switch 70 for a parallel connection between the first battery 10 and the second battery 20, a protection switch 74 for the second battery 20, an alternator 30 as an electric power generator, and a control device 80. In addition, the electric power supply apparatus 100 is provided with a starter 40, a first auxiliary machine group 50, and a second auxiliary machine group 60 as loads for the electric power supplies. In the following description, the first battery will be referred to as a "Bt1" and the second battery will be referred to as a "Bt2" in some cases. In addition, the alternator will be referred to as an "Alt" and the starter will be referred to as a "St" in some cases. The first auxiliary machine group will be referred to as an "H1" and the second auxiliary machine group will be referred to as an "H2" in some cases. The connection switch will be referred to as a "SWa" and the protection switch will be referred to as a "SWp" in some cases.

The first battery (Bt1) 10, the alternator (Alt) 30, the starter (St) 40, and the first auxiliary machine group (H1) 50 are connected in parallel to each other via a first electric power supply line PL1. The second battery (Bt2) 20 and the second auxiliary machine group (H2) 60 are connected in parallel to each other via a second electric power supply line PL2. The second battery 20 is disconnectably connected to the second electric power supply line PL2 via the protection switch (SWp). The first electric power supply line PL1 and the second electric power supply line PL2 are disconnectably connected to each other via the connection switch (SWa) 70. In other words, the second battery 20 and the second auxiliary machine group 60 are connected in parallel to the first battery 10, the starter 40, and the first auxiliary machine group 50 in a state where the connection switch 70 is ON and are disconnected from the first battery 10, the starter 40, and the first auxiliary machine group 50 in a state where the connection switch 70 is OFF. Relay switches, for example, are used as the connection switch 70 and the protection switch 74.

The first auxiliary machine group 50 is an electrical load. It is desirable that the first auxiliary machine group 50 can receive electric power all the time. Examples thereof include an audio, an air-conditioning device, a safety device, a car navigation system, and an actuator for traveling such as an actuator for steering and an actuator for a suspension. Also, the control device 80 is a type of the first auxiliary machine group 50.

The second auxiliary machine group 60 is an electrical load that consumes a small amount of electricity. The second auxiliary machine group 60 does not have to be capable of receiving electric power all the time. Examples thereof include an actuator that is temporarily operated regularly or irregularly.

The alternator 30 is an electric power generator that performs electric power generation by the torque which is generated by the engine (hereinafter, referred to as "fuel electric power generation" in some cases) or performs electric power generation by deceleration regeneration (referred to as "regenerative brake" in some cases) (referred to as "regenerative electric power generation" in some cases). Both the first battery 10 and the second battery 20 are charged with the electric power that is generated by the alternator 30 in a case where the first battery 10 and the second battery 20 are connected in parallel to each other. Only the first battery 10 is charged with the electric power that is generated by the alternator 30 in a case where the first battery 10 and the second battery 20 are separated from each other.

The starter 40 is a motor for engine start. In a case where the first battery 10 and the second battery 20 are connected in parallel to each other, the starter 40 applies torque to the engine, by receiving electric power feeding from the first battery 10 and the second battery 20 and rotating, to start the engine. In a case where the first battery 10 and the second battery 20 are separated from each other, the starter 40 applies torque to the engine, by receiving electric power feeding only from the first battery 10 and rotating, to start the engine.

A lead storage battery is used as the first battery 10. Various types of storage batteries such as a lithium-ion secondary battery, a nickel-hydrogen secondary battery, and a lead storage battery are used as the second battery 20.

In a case where the connection switch 70 is OFF, electric power feeding to the starter 40 and the first auxiliary machine group 50 is executed by the first battery 10 and electric power feeding to the second auxiliary machine group 60 is executed by the second battery 20 as described later. In a case where the connection switch 70 is ON, electric power feeding to the starter 40, the first auxiliary machine group 50, and the second auxiliary machine group 60 is executed by both the first battery 10 and the second battery 20 as described later.

The control device 80 is an electronic control unit (ECU, not illustrated) that is configured as a computer which is provided with, for example, a CPU executing a computer program, a ROM storing the computer program and the like, a RAM temporarily storing data, and an I/O port connected to various sensors, an actuator, and the like. The control device 80 functions as an Alt control unit 82 that controls electric power generation by the alternator 30 and an electric power supply control unit 84 that controls the parallel connection between the first battery 10 and the second battery 20. In addition, the control device 80 is operated not only as the Alt control unit 82 and the electric power supply control unit 84 but also as various functional blocks for electronic control such as a functional block that controls the operation of the starter 40 (referred to as a "starter control unit" in some cases), a functional block that controls the idle reduction by using the Alt control unit and the starter control unit, a functional block that controls the traveling state, and a brake-controlling functional block. According to the description of this embodiment, the functional blocks in the control device (electronic control unit) 80 such as the electric power supply control unit 84 and the Alt control unit 82 constitute the control device 80. However, some of the functional blocks may be configured to be independent and external control devices or each of the blocks may be configured to be an independent and external control device.

The Alt control unit 82 controls the fuel electric power generation and the regenerative electric power generation of the alternator 30. Details of the control are general, and thus description thereof will be omitted. In addition, the Alt control unit 82 controls the operation state of the alternator 30 in response to a request from the electric power supply control unit 84 as described later. In a case where the alternator 30 is in an electric power generation state, the Alt control unit 82 directs an electric power generation voltage in accordance with the fuel electric power generation (14 V to 15 V) during the fuel electric power generation and directs an electric power generation voltage (for example, 15 V) in accordance with the regenerative electric power generation during the regenerative electric power generation. In this manner, the Alt control unit 82 operates the alternator 30 in a state where electric power is being generated (electric power generation state). In addition, in a case where the alternator 30 is operated in a state where no electric power is being generated (electric power generation suppression state), the Alt control unit 82 directs an electric power generation suppression voltage (for example, 12 V) in accordance with the electric power generation suppression state. In this manner, the Alt control unit 82 operates the alternator 30 in the electric power generation suppression state.

As described later, the electric power supply control unit 84 controls the opening and closing of the connection switch 70 and the protection switch 74 based on a first battery voltage VBt1 and a second battery voltage VBt2 and controls the parallel connection between the first battery 10 and the second battery 20. The first battery voltage VBt1 (hereinafter, referred to as a "VBt1" in some cases) and the second battery voltage VBt2 (hereinafter, referred to as a "VBt2" in some cases) are detected by voltage sensors (not illustrated) that are disposed in respective output terminals.

Figure 2:
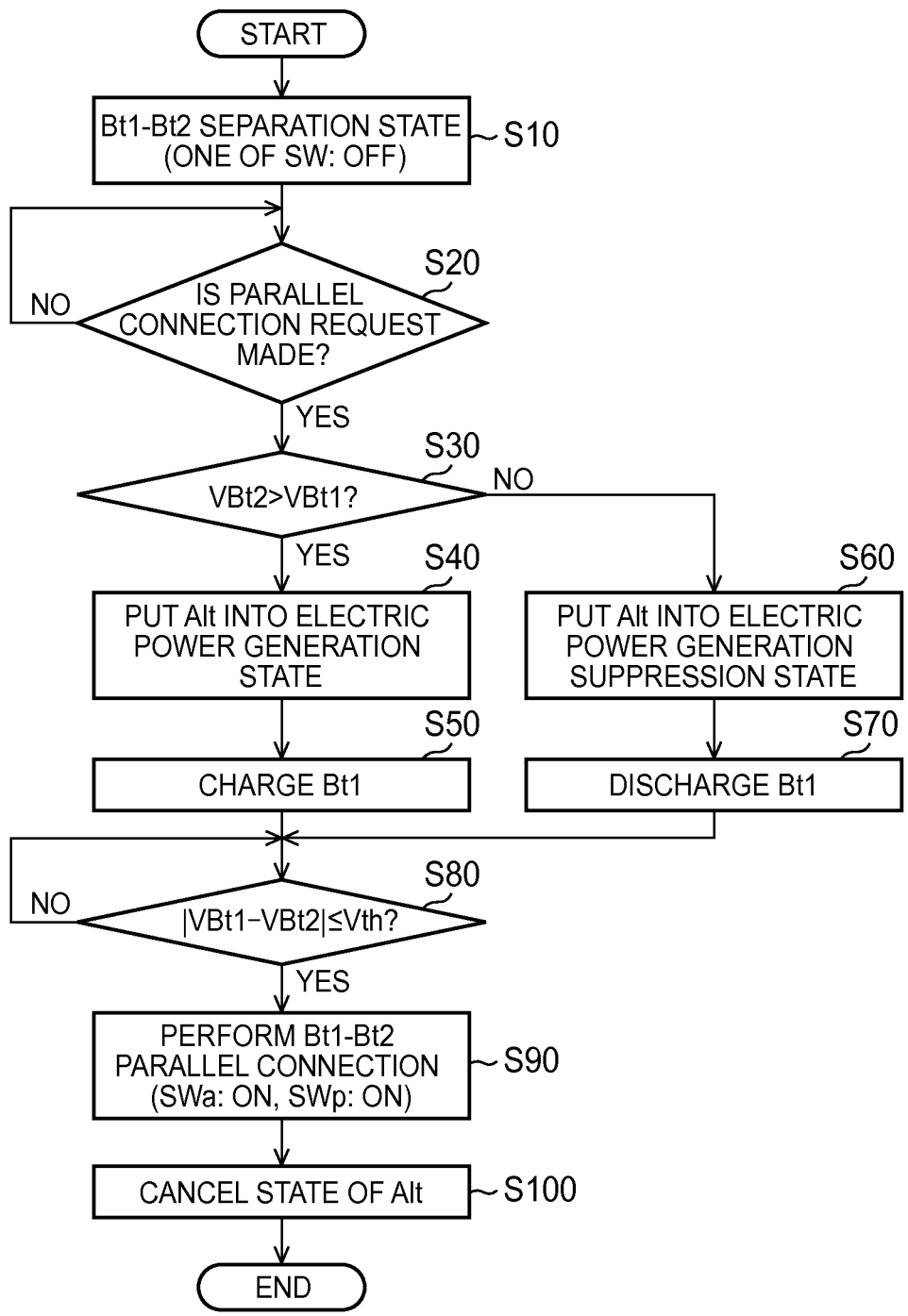
FIG. 2 is a flowchart illustrating the control of a parallel connection between a first battery and a second battery that is executed by an electric power supply control unit.

FIG. 2 is a flowchart illustrating the control of the parallel connection between the first battery 10 and the second battery 20 that is executed by the electric power supply control unit 84. This control flow is executed by the electric power supply control unit 84 when an event occurs in which the connection switch 70 is turned OFF and the parallel connection between the first battery 10 and the second battery 20 is released. It is considered that examples of the event in which the parallel connection is cancelled include various cases such as a case where the electric power storage (state of charge, SOC) of the second battery 20 is degraded and it has become impossible to execute electric power feeding for the load together with the first battery 10 (hereinafter, referred to as "low SOC" in some cases) and a case where the second battery 20 is to be maintained in a high-SOC state as a backup electric power supply. The low SOC is a state where at least the small electric power that is consumed by the second auxiliary machine group (H2) 60 can be sufficiently ensured.

Firstly, in Step S10, the electric power supply control unit 84 turns OFF one of the switches (SW), the connection switch 70 herein, so that the first battery 10 and the second battery 20 are in the separation state. In Step S20, the electric power supply control unit 84 stands by until the generation of a parallel connection request. As described later, the parallel connection request is generated outside the electric power supply control unit 84, for example, in the functional block that controls the traveling state or the Alt control unit 82, in, for example, a case where the regenerative electric power generation by the alternator 30 is executed, a case where the fuel electric power generation by the alternator 30 is executed for recovery from the low SOC, or the like. A parallel connection request flag is turned ON in a case where the parallel connection request is generated.

In a case where the parallel connection request is generated, the electric power supply control unit 84 compares the first battery voltage VBt1 and the second battery voltage VBt2 to each other in Step S30. In a case where the second battery voltage VBt2 exceeds the first battery voltage VBt1 (Step S30: Yes), the electric power supply control unit 84 allows the alternator 30 to be in the electric power generation state by the control of the Alt control unit 82 in Step S40 and executes the charging of the first battery 10 by the alternator 30 in Step S50. To allow the alternator 30 "to be in the electric power generation state" includes maintaining the electric power generation state as well as changing from the electric power generation suppression state to the electric power generation state. In a case where the second battery voltage VBt2 does not exceed the first battery voltage VBt1 (Step S30: No), the electric power supply control unit 84 allows the alternator 30 to be in the electric power generation suppression state by the control of the Alt control unit 82 in Step S60 and executes discharging by electric power feeding from the first battery 10 to the first auxiliary machine group 50 in Step S70. To allow the alternator 30 "to be in the electric power generation suppression state" includes maintaining the electric power generation suppression state as well as changing from the electric power generation state to the electric power generation suppression state.

Then, in Step S80, the electric power supply control unit 84 stands by until the difference between the first battery voltage VBt1 and the second battery voltage VBt2 becomes equal to or less than a threshold Vth that is determined in advance, that is, until the following expression (1) is satisfied.

$$|VBt1 - VBt2| \leq Vth \quad (1)$$

A voltage difference that is acceptable as energy loss attributable to the parallel connection is appropriately set as the threshold Vth. For example, any value within a range of 1% to 10% of an output voltage reference value is set as the threshold Vth.

In a case where the difference between the first battery voltage VBt1 and the second battery voltage VBt2 becomes equal to or less than the threshold Vth that is determined in advance, the electric power supply control unit 84 turns ON the connection switch 70 and the protection switch 74 in Step S90 and connects the first battery 10 and the second battery 20 in parallel to each other. Then, in Step S100, the electric power supply control unit 84 cancels the electric power generation state of Step S40 or the electric power generation suppression state of Step S60 by the Alt control unit 82, returns the operation state of the alternator 30 to a normal control state by the Alt control unit 82, and terminates this control flow.

Figure 3:
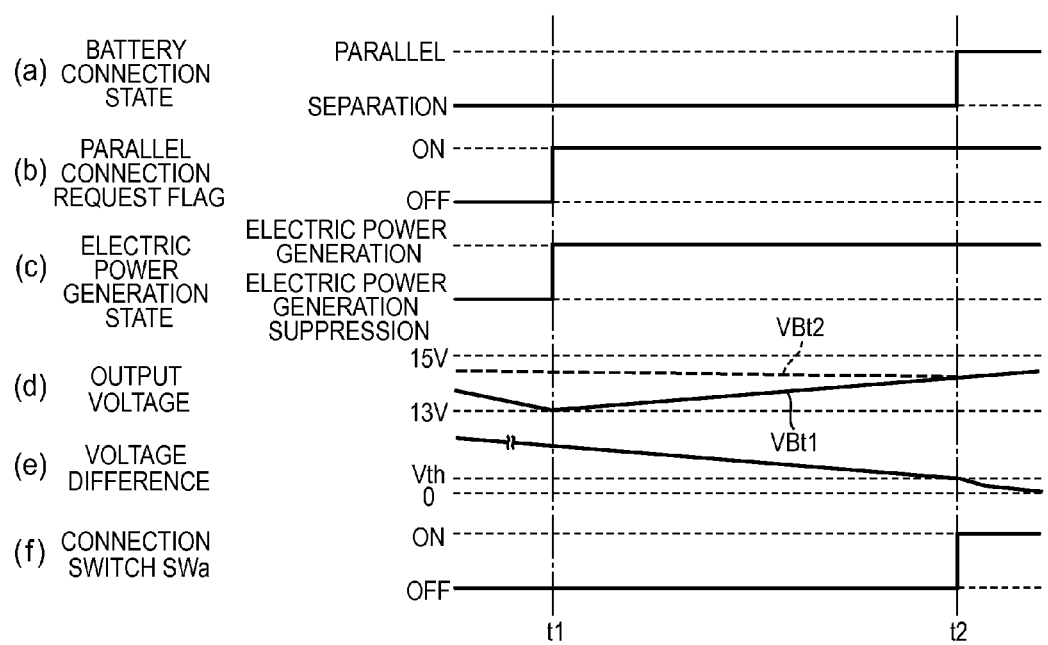
FIG. 3 is a time chart illustrating an example of a case where the first battery and the second battery are connected in parallel to each other by charging the first battery in accordance with the control flow that is illustrated in FIG. 2.

FIG. 3 is a time chart illustrating an example of a case where the first battery 10 and the second battery 20 are connected in parallel to each other by charging the first battery 10 in accordance with the control flow that is illustrated in FIG. 2. The connection switch (SWa) 70 is OFF as illustrated in FIG. 3(*f*) and the battery connection state is the separation state as illustrated in FIG. 3(*a*). In addition, the alternator 30 is in the electric power generation suppression state as illustrated in FIG. 3(*c*), and discharging by electric power feeding from the first battery 10 to the load (first auxiliary machine group 50) is executed and discharging by electric power feeding from the second battery 20 to the load (second auxiliary machine group 60) is executed in this state. Accordingly, the first battery voltage VBt1 and the second battery voltage VBt2 decrease in accordance with electric power consumption by the loads as illustrated in FIG. 3(*d*).

At time t1, the parallel connection request is generated and the parallel connection request flag is turned ON from OFF as illustrated in FIG. 3(*b*). In this case, the second battery voltage VBt2 exceeds the first battery voltage VBt1 as illustrated in FIG. 3(*d*). Accordingly, the alternator 30 enters the electric power generation state and the charging of the first battery 10 is initiated as illustrated in FIG. 3(*c*). Then, the first battery voltage VBt1 rises to become equal to the second battery voltage VBt2. Then, at time t2, the difference (absolute value) between the first battery voltage VBt1 and the second battery voltage VBt2 becomes equal to or less than the threshold Vth as illustrated in FIG. 3(e). In this case, the connection switch (SWa) 70 is turned ON as illustrated in FIG. 3(f) and the battery connection state becomes the parallel connection state as illustrated in FIG. 3(a). Then, the operation state of the alternator 30 returns to the normal state with the forcibly-set electric power generation state cancelled. FIG. 3(c) illustrates a state where the electric power generation state is maintained as it is.

Figure 4:
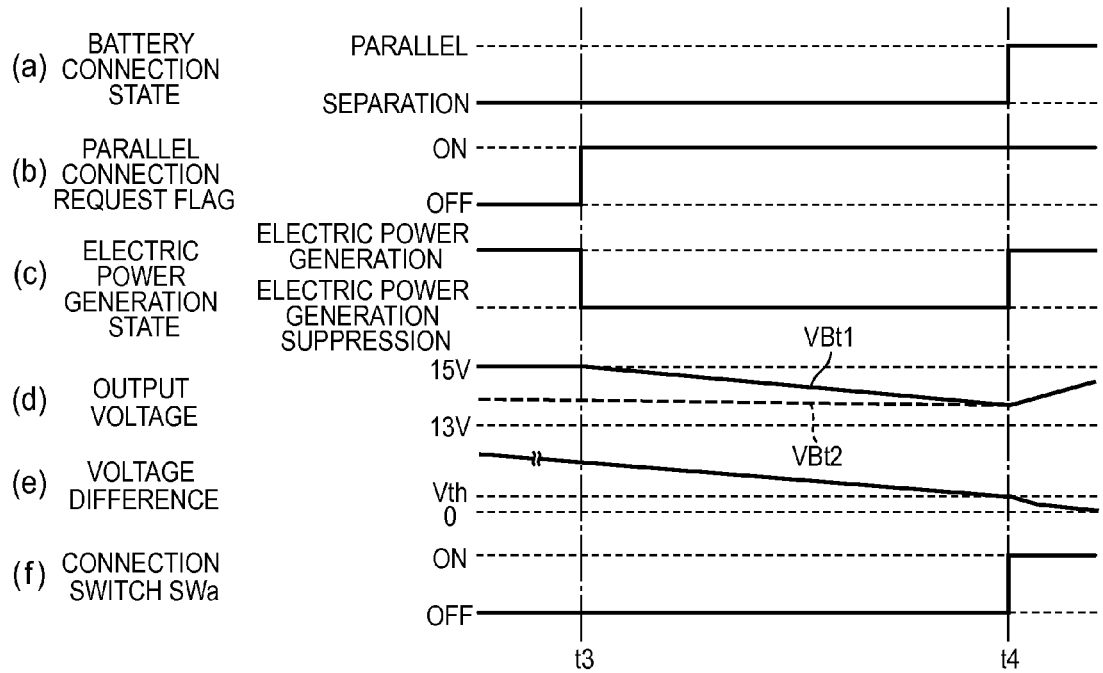
FIG. 4 is a time chart illustrating an example of a case where the first battery and the second battery are connected in parallel to each other by discharging the first battery in accordance with the control flow that is illustrated in FIG. 2.

FIG. 4 is a time chart illustrating an example of a case where the first battery 10 and the second battery 20 are connected in parallel to each other by discharging the first battery 10 in accordance with the control flow that is illustrated in FIG. 2. The connection switch (SWa) 70 is OFF as illustrated in FIG. 4(f) and the battery connection state is the separation state as illustrated in FIG. 4(a). In addition, the alternator 30 is in the electric power generation state as illustrated in FIG. 4(c), and the charging of the second battery 20 is not executed in this state although the charging of the first battery 10 is executed. In this case, the discharging of the second battery 20 by electric power feeding to the load (second auxiliary machine group 60) is executed in this state. Accordingly, the second battery voltage VBt2 decreases in accordance with electric power consumption by the load, as illustrated in FIG. 4(d), although the first battery voltage VBt1 is raised by the charging.

At time t3, the parallel connection request is generated and the parallel connection request flag is turned ON from OFF as illustrated in FIG. 4(b). In this case, the second battery voltage VBt2 is exceeded by the first battery voltage VBt1 as illustrated in FIG. 4(d). Accordingly, the alternator 30 enters the electric power generation suppression state and discharging by electric power feeding from the first battery 10 to the load (first auxiliary machine group 50) is initiated as illustrated in FIG. 4(c). Then, the first battery voltage VBt1 decreases to become equal to the second battery voltage VBt2. Then, at time t4, the difference (absolute value) between the first battery voltage VBt1 and the second battery voltage VBt2 becomes equal to or less than the threshold Vth as illustrated in FIG. 4(e). In this case, the connection switch (SWa) 70 is turned ON as illustrated in FIG. 4(f) and the battery connection state becomes the parallel connection state as illustrated in FIG. 4(a). Then, the operation state of the alternator 30 returns to the normal state with the forcibly-set electric power generation suppression state cancelled. FIG. 4(c) illustrates a state where the state has returned from the electric power generation suppression state to the electric power generation state.

As described above, in this embodiment, the charging of the first battery 10 by the electric power generation of the alternator 30 is executed in a case where the parallel connection is performed in the separation state where the parallel connection between the first battery 10 and the second battery 20 is cancelled and the second battery voltage VBt2 exceeds the first battery voltage VBt1. In this manner, the first battery voltage VBt1 is raised, the difference (absolute value) between the first battery voltage VBt1 and the second battery voltage VBt2 becomes equal to or less than the threshold Vth, and the first battery 10 and the second battery 20 can be connected in parallel to each other. Accordingly, it is possible to suppress the electric energy loss attributable to the inter-battery output voltage difference during the parallel connection between the two batteries. In addition, in a case where the first battery voltage VBt1 exceeds the second battery voltage VBt2, the electric power generation of the alternator 30 is suppressed and discharging by electric power feeding from the first battery 10 to the load is executed. In this manner, the first battery voltage VBt1 is lowered, the difference (absolute value) between the first battery voltage VBt1 and the second battery voltage VBt2 becomes equal to or less than the threshold Vth, and the first battery 10 and the second battery 20 can be connected in parallel to each other. Accordingly, it is possible to suppress the electric energy loss attributable to the inter-battery output voltage difference during the parallel connection between the two batteries. Accordingly, in this embodiment, it is possible to perform the parallel connection while suppressing the electric energy loss and voltage variation with ease and without using any converter according to the related art, and thus the apparatus can become simplified, compact, and inexpensive.

The function of performing the comparison between the first battery voltage VBt1 and the second battery voltage VBt2 of Step S30 relates to a voltage comparison unit of the invention. The function of performing the charging of the first battery 10 of Steps S40 and S50 and the function of performing the discharging of the first battery 10 of Steps S60 and S70 relates to a voltage adjustment unit of the invention. The function of performing the stand-by until the difference between the first battery voltage VBt1 and the second battery voltage VBt2 becomes equal to or less than the threshold Vth that is determined in advance of Step S80 and the function of performing the parallel connection of Step S90 relates to a connection processing unit of the invention.

When the parallel connection and the separation between the first battery 10 and the second battery 20 is controlled by the electric power supply control unit 84, the switching of the electric power supply connection state in accordance with various vehicle operation states, examples of which will be described below, can be effectively performed.

Figure 5:
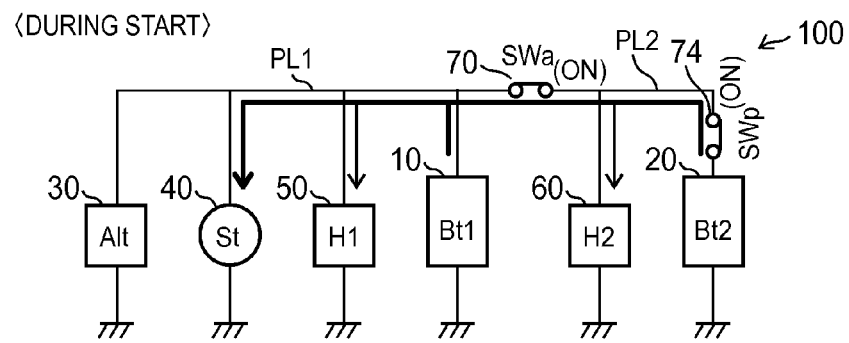
FIG. 5 is an explanatory diagram illustrating the state of the electric power supply apparatus during engine start by a start key operation.

FIG. 5 is an explanatory diagram illustrating the state of the electric power supply apparatus 100 during engine start by a start key operation. When the engine is started through the start key (not illustrated) operation for the vehicle (car), the protection switch 74 and the connection switch 70 are ON and the first battery 10 and the second battery 20 are connected in parallel to each other. In this manner, electric power feeding is performed from both the first battery 10 and the second battery 20 to the starter 40 as well as the first auxiliary machine group 50 and the second auxiliary machine group 60, and engine startability based on the start key operation can be improved.

Figure 6:
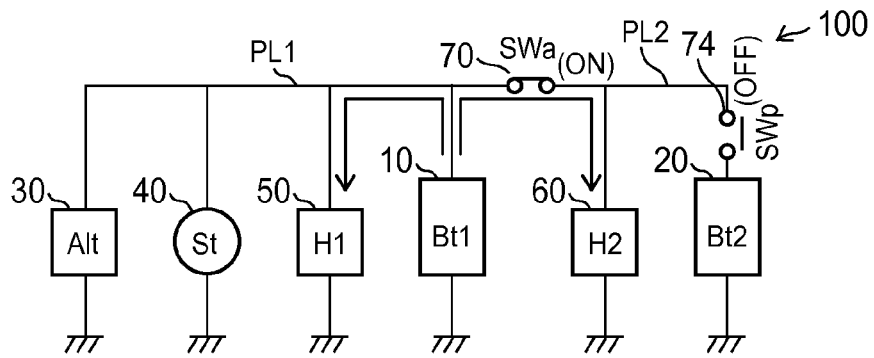
FIG. 6 is an explanatory diagram illustrating the state of the electric power supply apparatus at a time when a vehicle is left unattended.

FIG. 6 is an explanatory diagram illustrating the state of the electric power supply apparatus 100 at a time when the vehicle is left unattended. When the engine is stopped and the vehicle is left unattended, the protection switch 74 is OFF although the connection switch 70 is ON, and only the second battery 20 is in an isolated state. In this manner, dark currents for the first auxiliary machine group 50 and the second auxiliary machine group 60 are procured by electric power feeding from the first battery 10, and the SOC of the second battery 20 can be preserved as a backup.

Figure 7:
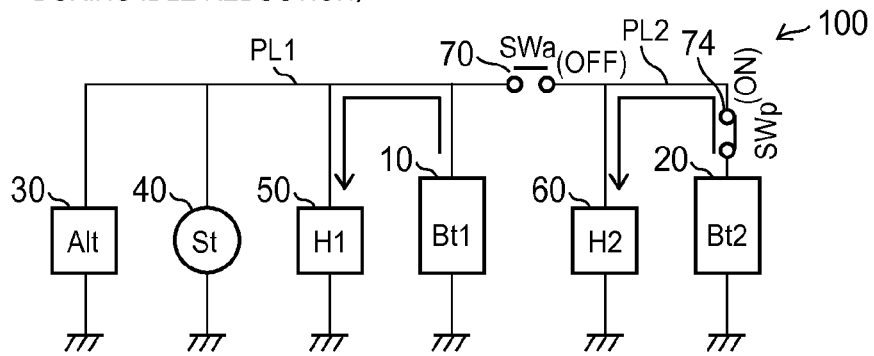
FIG. 7 is an explanatory diagram illustrating the state of the electric power supply apparatus during fuel electric power generation stop or idle reduction.

FIG. 7 is an explanatory diagram illustrating the state of the electric power supply apparatus 100 during fuel electric power generation stop or the idle reduction. During the fuel electric power generation stop or the idle reduction, the connection switch 70 is OFF although the protection switch 74 is ON, and the first electric power supply line PL1 to which the first battery 10 is connected and the second electric power supply line PL2 to which the second battery 20 is connected are separated from each other in this state. Electric power feeding to the first auxiliary machine group 50 is performed by the first battery 10 and electric power feeding to the second auxiliary machine group 60 is performed by the second battery 20, and the electric power storage amount of the second battery 20 can be subjected to an aggressive consumption. Accordingly, both the first battery 10 and the second battery 20 can be efficiently charged with the electric power that is generated when the alternator 30 executes the regenerative electric power generation.

Figure 8:
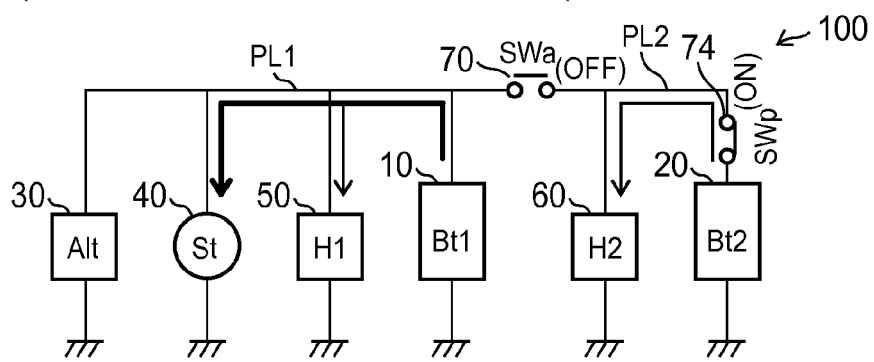
FIG. 8 is an explanatory diagram illustrating the state of the electric power supply apparatus during restart after the idle reduction.

FIG. 8 is an explanatory diagram illustrating the state of the electric power supply apparatus 100 during restart after the idle reduction. During the idle reduction, the connection switch 70 is OFF although the protection switch 74 is ON as illustrated in FIG. 7. The first electric power supply line PL1 to which the first battery 10 is connected and the second electric power supply line PL2 to which the second battery 20 is connected are separated from each other in this state. As described above, electric power feeding to the first auxiliary machine group 50 is performed by the first battery 10 and electric power feeding to the second auxiliary machine group 60 is performed by the second battery 20. During the electric power feeding, the electric power consumption amount is different between the first auxiliary machine group 50 and the second auxiliary machine group 60, and it is not preferable, in terms of electric energy loss, to connect the first battery 10 and the second battery 20 in parallel to each other during the restart after the idle reduction. Accordingly, it is preferable that the engine restart is executed by operating the starter 40 by electric power feeding from the first battery 10 with the battery connection state during the restart after the idle reduction being maintained as it is in the separation state during the idle reduction.

Figure 9:
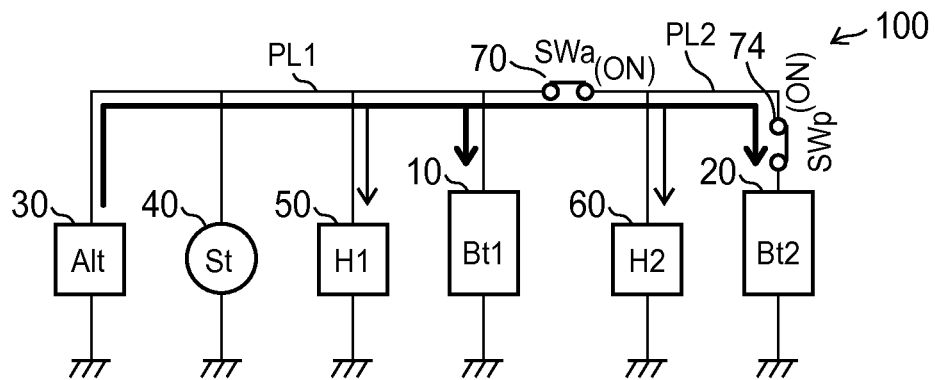
FIG. 9 is an explanatory diagram illustrating the state of the electric power supply apparatus during deceleration regeneration.

FIG. 9 is an explanatory diagram illustrating the state of the electric power supply apparatus 100 during the deceleration regeneration. During the regenerative electric power generation that is executed by the alternator 30 in response to vehicle deceleration, the protection switch 74 and the connection switch 70 are ON and the first battery 10 and the second battery 20 are connected in parallel to each other. In this manner, the electric power that is generated by the regenerative electric power generation of the alternator 30 is supplied to the first auxiliary machine group 50 and the second auxiliary machine group 60, and both the first battery 10 and the second battery 20 are charged with the electric power. The electric power that is obtained by the regenerative electric power generation can be efficiently stored and used.

Figure 10:
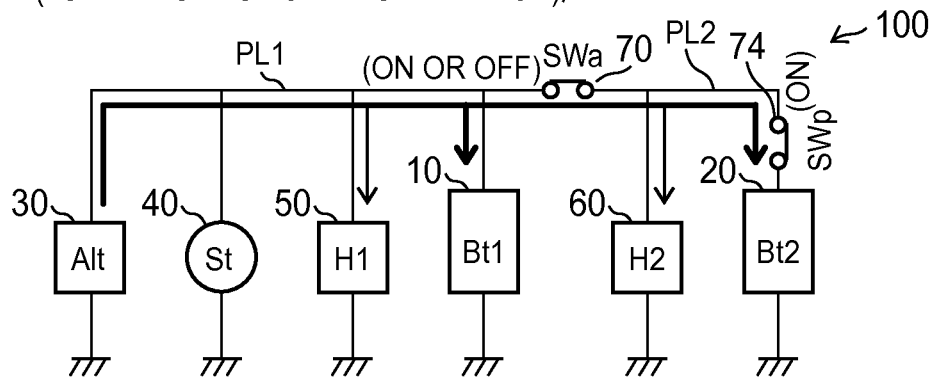
FIG. 10 is an explanatory diagram illustrating the state of the electric power supply apparatus during SOC recovery control.

FIG. 10 is an explanatory diagram illustrating the state of the electric power supply apparatus 100 during SOC recovery control. During the SOC recovery control, the protection switch 74 and the connection switch 70 are ON and the first battery 10 and the second battery 20 are connected in parallel to each other as in the case of the deceleration regeneration of the vehicle that is illustrated in FIG. 9. In this manner, the electric power that is generated by the fuel electric power generation of the alternator 30 is supplied to the first auxiliary machine group 50 and the second auxiliary machine group 60, and both the first battery 10 and the second battery 20 can be charged with the electric power. As a result, the first battery 10 or the second battery 20 in the low SOC state can be recovered. In a case where the priority of the recovery is given only to the SOC of the first battery 10, only the first battery 10 may be charged by the fuel electric power generation of the alternator 30 with the connection switch 70 being OFF.

The state of the electric power supply apparatus 100 described with reference to FIGS. 7 to 10 is just an example of the state of the connection between the first battery 10 and the second battery 20. The invention is not limited thereto, and the state of the connection between the first battery 10 and the second battery 20 is controlled by the control of the electric power supply control unit 84 so as to respond to various states depending on the vehicle operation states.

B. Second Embodiment

A second embodiment assumes the electric power supply apparatus 100 that is identical to the electric power supply apparatus 100 (refer to FIG. 1) of the first embodiment. Herein, a case where the control flow for the parallel connection that is executed by the electric power supply control unit 84 is a control flow different from the control flow (refer to FIG. 2) for the parallel connection according to the first embodiment will be described.

Figure 11:
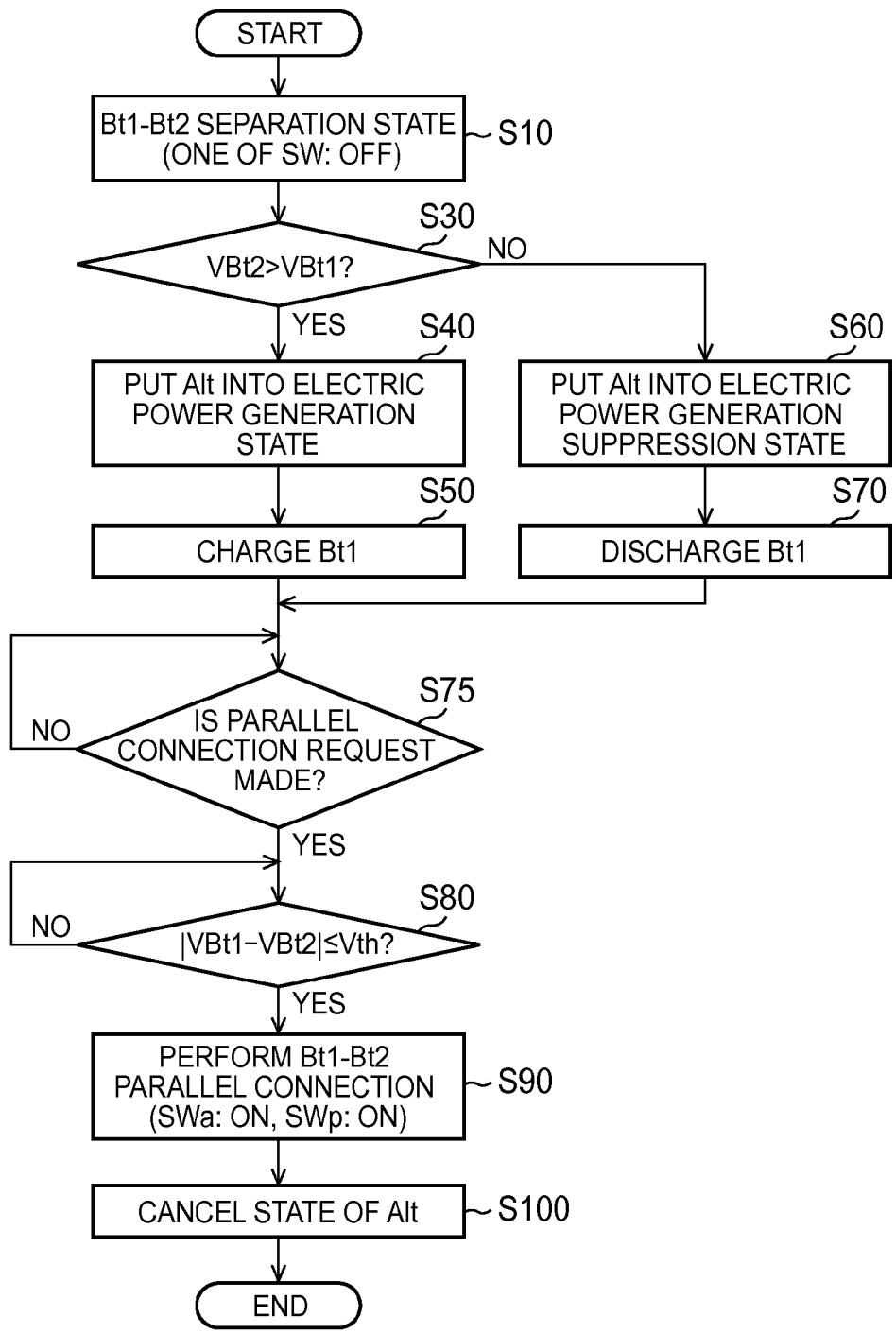
FIG. 11 is a flowchart illustrating the control of a parallel connection according to a second embodiment.

FIG. 11 is a flowchart illustrating the control of the parallel connection according to the second embodiment. As is apparent from a comparison to the control flow that is illustrated in FIG. 2, this control flow differs from the control flow that is illustrated in FIG. 2 only in that the processing for waiting for the generation of the connection request of Step S20 in FIG. 2 is omitted and the processing for waiting for the generation of the connection request identical to that of Step S20 in FIG. 2 is added as Step S75 directly before Step S80 in FIG. 2.

In the control flow according to this embodiment, the first battery voltage VBt1 and the second battery voltage VBt2 are compared to each other (Step S30), regardless of the presence or absence of the parallel connection request, when the parallel connection between the first battery 10 and the second battery 20 is cancelled for the separation state (Step S10). The charging of the first battery 10 (Steps S40 and S50) or the discharging of the first battery 10 (Steps S60 and S70) is initiated in accordance with the result of the comparison. Then, the electric power supply control unit 84 waits for the generation of the connection request (Step S75). In addition, the electric power supply control unit 84 waits until the difference (absolute value) between the first battery voltage VBt1 and the second battery voltage VBt2 becomes equal to or less than the threshold Vth (Step S80). Then, the electric power supply control unit 84 turns ON the connection switch 70 and the protection switch 74 so that the first battery 10 and the second battery 20 are connected in parallel to each other (Step S90).

Even in this embodiment, the first battery 10 can be charged or discharged as in the first embodiment so that the difference (absolute value) between the first battery voltage VBt1 and the second battery voltage VBt2 becomes equal to or less than the threshold Vth and the first battery 10 and the second battery 20 are connected in parallel to each other in a case where the parallel connection is performed from the separation state where the parallel connection between the first battery 10 and the second battery 20 is cancelled. Accordingly, it is possible to suppress the electric energy loss attributable to the inter-battery output voltage difference during the parallel connection between the two batteries. Accordingly, even in this embodiment, it is possible to perform the parallel connection while suppressing the electric energy loss and the voltage variation with ease and without using any converter according to the related art, and thus the apparatus can become simplified, compact, and inexpensive.

In this embodiment, the charging of the first battery 10 is performed in a case where the second battery voltage VBt2 exceeds the first battery voltage VBt1 and the discharging of the first battery 10 is performed in a case where the first battery voltage VBt1 exceeds the second battery voltage VBt2 regardless of the presence or absence of the connection request. Accordingly, the difference (absolute value) between the first battery voltage VBt1 and the second battery voltage VBt2 has already become equal to or less than the threshold Vth at a point in time when the connection request is generated, and the parallel connection can be immediately performed.

In the control flow of this embodiment, whether or not the difference (absolute value) between the first battery voltage VBt1 and the second battery voltage VBt2 is equal to or less than the threshold Vth is determined (Step S80) after the generation of the parallel connection request (Step S75). However, this can also be modified as follows. The determination of Step S80 is executed after the execution of the charging (Step S50) or the discharging (Step S70) of the first battery 10. In a case where the difference (absolute value) between the first battery voltage VBt1 and the second battery voltage VBt2 exceeds the threshold Vth, the processing returns to Step S30 and is repeated regardless of the presence or absence of the parallel connection request. The parallel connection of Step S90 may be executed in a case where the difference (absolute value) between the first battery voltage VBt1 and the second battery voltage VBt2 has become equal to or less than the threshold Vth and the parallel connection request is made, and the processing may return to Step S30 and be repeated in a case where the parallel connection request is absent. In this case, the state where the difference (absolute value) between the first battery voltage VBt1 and the second battery voltage VBt2 is equal to or less than the threshold Vth is likely to be maintained until the generation of the parallel connection request. Accordingly, the parallel connection can be immediately performed in a case where the parallel connection request is made. Otherwise, the processing returns to Step S30 and is repeated regardless of the presence or absence of the parallel connection request.

C. Third Embodiment

A third embodiment assumes the electric power supply apparatus 100 that is identical to the electric power supply apparatus 100 (refer to FIG. 1) of the first embodiment as is the case with the second embodiment. Herein, a case where the control flow for the parallel connection that is executed by the electric power supply control unit 84 is a control flow different from the control flow (refer to FIG. 2) for the parallel connection according to the first embodiment will be described.

Figure 12:
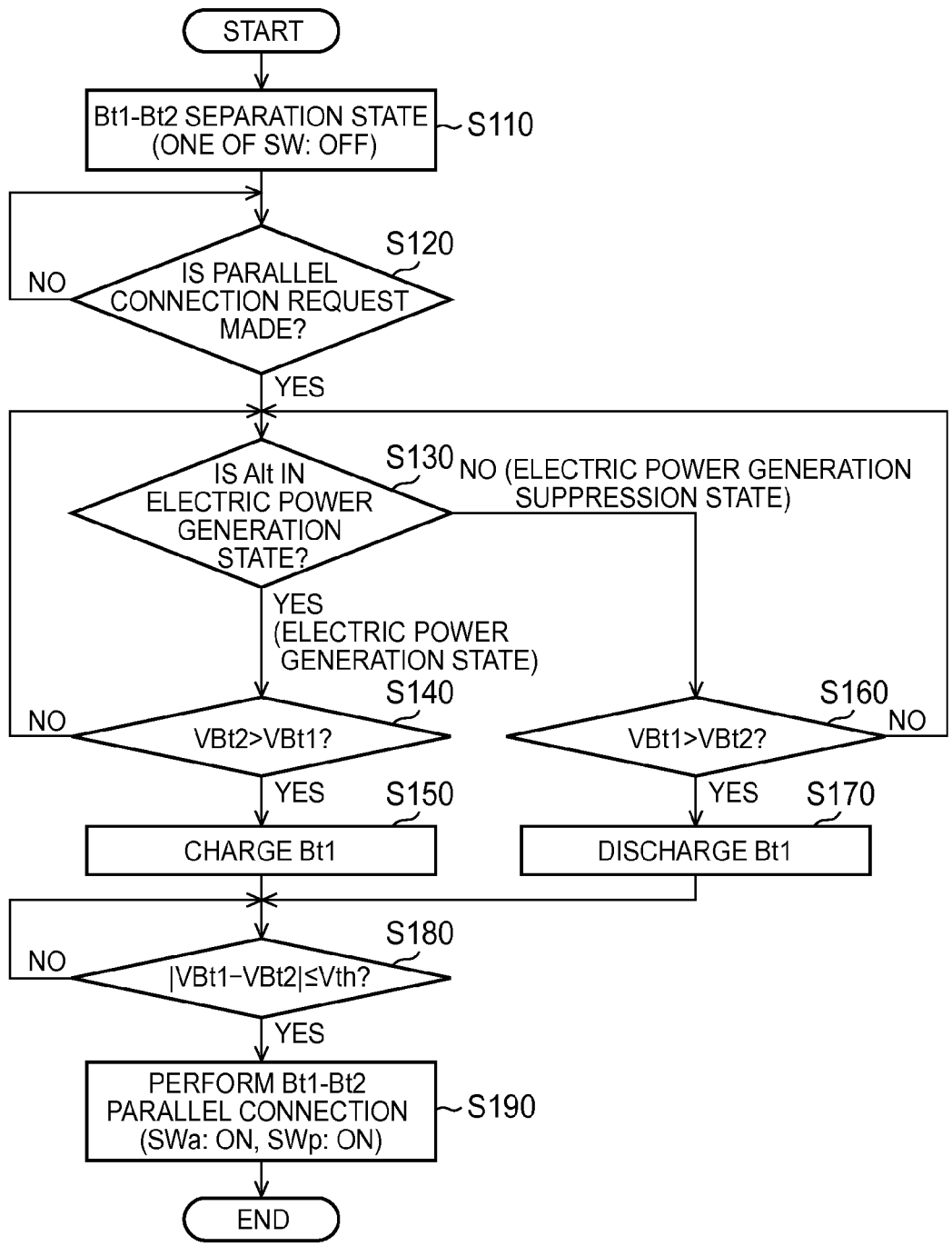
FIG. 12 is a flowchart illustrating the control of a parallel connection according to a third embodiment.

FIG. 12 is a flowchart illustrating the control of the parallel connection according to the third embodiment. Similarly to the control flow according to the first embodiment (refer to FIG. 2), this control flow is executed by the electric power supply control unit 84 when an event occurs in which the parallel connection between the first battery 10 and the second battery 20 is cancelled.

As in Steps S10 and S20 in FIG. 2, the electric power supply control unit 84 turns OFF one of the switches (SW), the connection switch 70 herein, first in Step S110 so that the first battery 10 and the second battery 20 are in the separation state. In Step S120, the electric power supply control unit 84 stands by until the generation of the parallel connection request.

In a case where the parallel connection request is generated, the electric power supply control unit 84 determines the operation state of the alternator 30 in Step S130, which is different from the control flow in FIG. 2. Then, the electric power supply control unit 84 executes different processing as follows depending on whether the alternator 30 is in the electric power generation state or the electric power generation suppression state.

In a case where the alternator 30 is in the electric power generation state, the first battery voltage VBt1 and the second battery voltage VBt2 are compared to each other in Step S140. In a case where the second battery voltage VBt2 exceeds the first battery voltage VBt1, the charging of the first battery 10 is executed in Step S150 (as in Step S50 in FIG. 2). In a case where the second battery voltage VBt2 is equal to or less than the first battery voltage VBt1, the processing returns to Step S130 and the electric power supply control unit 84 stands by until the state of the alternator 30 becomes the electric power generation suppression state.

In a case where the alternator 30 is in the electric power generation suppression state, the first battery voltage VBt1 and the second battery voltage VBt2 are compared to each other in Step S160. In a case where the first battery voltage VBt1 exceeds the second battery voltage VBt2, discharging by electric power feeding from the first battery 10 to the first auxiliary machine group 50 is executed in Step S170 (as in Step S70 in FIG. 2). In a case where the second battery voltage VBt2 is equal to or less than the first battery voltage VBt1, the processing returns to Step S130 and the electric power supply control unit 84 stands by until the state of the alternator 30 becomes the electric power generation state.

After the initiation of the charging or the discharging of the first battery 10, the electric power supply control unit 84 stands by in Step S180, as in Step S80 in FIG. 2, until the difference between the first battery voltage VBt1 and the second battery voltage VBt2 becomes equal to or less than the threshold Vth that is determined in advance, that is, until the expression (1) is satisfied. In a case where the difference (absolute value) between the first battery voltage VBt1 and the second battery voltage VBt2 becomes equal to or less than the threshold Vth that is determined in advance, the electric power supply control unit 84 turns ON the connection switch 70 and the protection switch 74 in Step S190, connects the first battery 10 and the second battery 20 in parallel to each other (as in Step S90 in FIG. 2), and terminates this control flow.

In the control flow according to the first embodiment, the first battery voltage VBt1 and the second battery voltage VBt2 are compared to each other when the parallel connection request is made, and then the charging is executed with the alternator 30 in the electric power generation state in a case where the first battery 10 should be charged and the discharging is executed with the alternator 30 in the electric power generation suppression state in a case where the first battery 10 should be discharged. In contrast, in the control flow according to this embodiment, the charging of the first battery 10 is executed in a case where the second battery voltage VBt2 exceeds the first battery voltage VBt1 with the alternator 30 in the electric power generation state and the discharging of the first battery 10 is executed in a case where the first battery voltage VBt1 exceeds the second battery voltage VBt2 with the alternator 30 in the electric power generation suppression state when the parallel connection request is made. In this case, the correspondence relationship between the charging or the discharging that should be executed in accordance with the magnitude relationship between the first battery voltage VBt1 and the second battery voltage VBt2 and the operation state of the alternator 30 may differ. Accordingly, the problem of having to stand by until the correspondence relationship becomes consistent arises. However, apart from this problem, the first battery 10 can be charged or discharged as in the first embodiment so that the difference (absolute value) between the first battery voltage VBt1 and the second battery voltage VBt2 becomes equal to or less than the threshold Vth and the first battery 10 and the second battery 20 are connected in parallel to each other in a case where the parallel connection is performed from the separation state where the parallel connection between the first battery 10 and the second battery 20 is cancelled. Accordingly, it is possible to suppress the electric energy loss attributable to the inter-battery output voltage difference during the parallel connection between the two batteries. Accordingly, even in this embodiment, it is possible to perform the parallel connection while suppressing the electric energy loss and the voltage variation with ease and without using any converter according to the related art, and thus the apparatus can become simplified, compact, and inexpensive.

D. Fourth Embodiment

Figure 13:
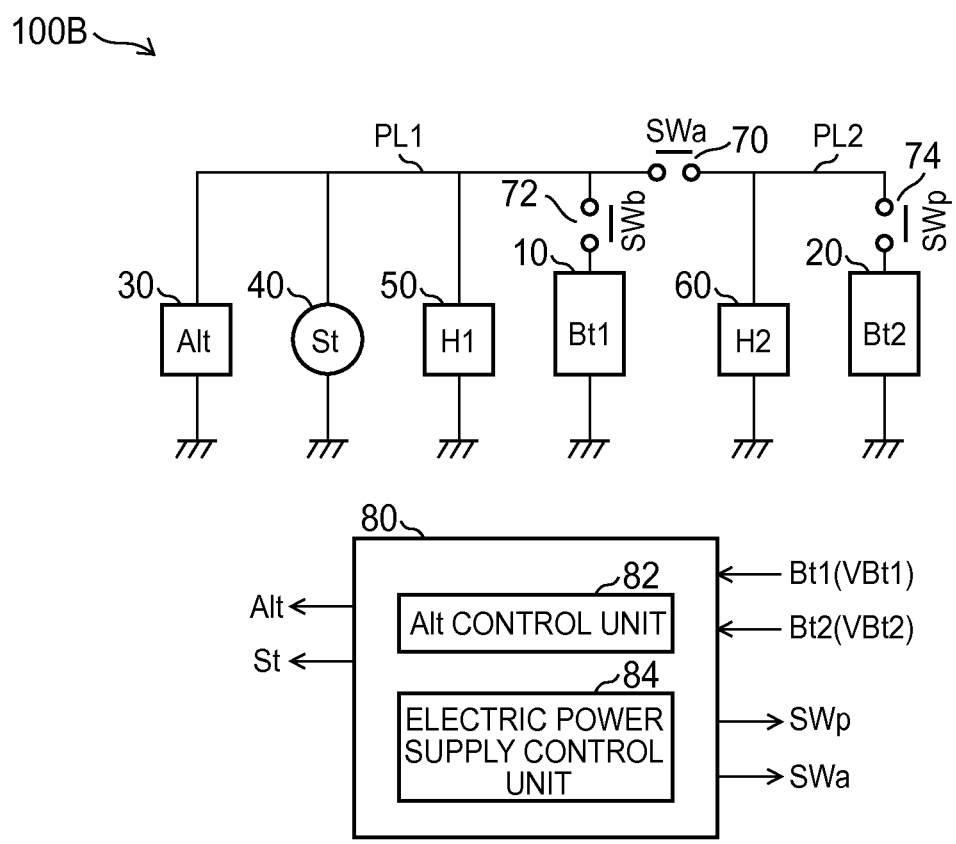
FIG. 13 is an explanatory diagram illustrating a schematic configuration of an electric power supply apparatus according to a fourth embodiment.

FIG. 13 is an explanatory diagram illustrating a schematic configuration of an electric power supply apparatus 100B according to a fourth embodiment. The electric power supply apparatus 100B is different from the electric power supply apparatus 100 according to the first embodiment only in that a connection switch (SWb) 72 is disposed between the first battery 10 and the first electric power supply line PL1 of the electric power supply apparatus 100 that is illustrated in FIG. 1. In the following description, the connection switch (SWa) 70 between the first electric power supply line PL1 and the second electric power supply line PL2 will be referred to as a "first connection switch 70" in some cases and the connection switch (SWb) 72 between the first battery 10 and the first electric power supply line PL1 will be referred to as a "second connection switch 72" in some cases.

FIG. 14 is a flowchart illustrating the control of the parallel connection according to the fourth embodiment that is executed by an electric power supply control unit 84. Similarly to the control flow according to the first embodiment (refer to FIG. 2), this control flow is executed by the electric power supply control unit 84 when an event occurs in which the parallel connection between the first battery 10 and the second battery 20 is cancelled.

Firstly, in Step S210, the electric power supply control unit 84 turns OFF one of the switches (SW), at least one of the first connection switch 70 and the second connection switch 72 herein, as in Step S110 in FIG. 12 so that the first battery 10 and the second battery 20 are in the separation state. The ON/OFF of the connection switch is determined in accordance with the operation situation that has been described in the first embodiment. Then, in Step S220, the electric power supply control unit 84 stands by until the generation of the parallel connection request as in Step S210 in FIG. 12.

In a case where the parallel connection request is generated, the electric power supply control unit 84 determines the operation state of the alternator 30 in Step S230 as in Step S130 in FIG. 12. Then, the electric power supply control unit 84 executes different processing as follows depending on whether the alternator 30 is in the electric power generation state or the electric power generation suppression state.

In a case where the alternator 30 is in the electric power generation state, the first battery voltage VBt1 and the second battery voltage VBt2 are compared to each other in Step S240 as in Step S140 in FIG. 12. In a case where the second battery voltage VBt2 exceeds the first battery voltage VBt1, the first connection switch 70 is turned OFF and the second connection switch 72 is turned ON in Step S250a and the charging of the first battery 10 is executed (as in Step S150 in FIG. 12). In a case where the second battery voltage VBt2 is equal to or less than the first battery voltage VBt1, the first connection switch 70 and the protection switch 74 are turned ON and the second connection switch 72 is turned OFF in Step S250b, and the charging of the second battery 20 is executed.

In a case where the alternator 30 is in the electric power generation suppression state, the first battery voltage VBt1 and the second battery voltage VBt2 are compared to each other in Step S260 as in Step S160 in FIG. 12. In a case where the first battery voltage VBt1 exceeds the second battery voltage VBt2, the first connection switch 70 is turned OFF and the second connection switch 72 is turned ON, and discharging by electric power feeding from the first battery 10 to the first auxiliary machine group 50 is executed in Step S270a (as in Step S170 in FIG. 11). In a case where the second battery voltage VBt2 is equal to or less than the first battery voltage VBt1, the first connection switch 70 and the protection switch 74 are turned ON and the second connection switch 72 is turned OFF in Step S270b, and discharging by electric power feeding from the second battery 20 to the first auxiliary machine group 50 and the second auxiliary machine group 60 is executed.

After the initiation of the charging of one of the batteries with the alternator 30 in the electric power generation state or the discharging of one of the batteries with the alternator 30 in the electric power generation suppression state, the electric power supply control unit 84 stands by in Step S280, as in Step S180 in FIG. 12, until the difference (absolute value) between the first battery voltage VBt1 and the second battery voltage VBt2 becomes equal to or less than the threshold Vth that is determined in advance, that is, until the expression (1) is satisfied. In a case where the difference between the first battery voltage VBt1 and the second battery voltage VBt2 becomes equal to or less than the threshold Vth that is determined in advance, the electric power supply control unit 84 turns ON the first connection switch 70, the second connection switch 72, and the protection switch 74 in Step S290, connects the first battery 10 and the second battery 20 in parallel to each other (as in Step S190 in FIG. 12), and terminates this control flow.

In the electric power supply apparatus 100 according to the first to third embodiments, the first battery 10 is directly connected to the alternator 30 via the first electric power supply line PL1 (refer to FIG. 1). Accordingly, the rise in the first battery voltage VBt1 that is attributable to the charging of the first battery 10 or the lowering of the first battery voltage VBt1 that is attributable to the discharging of the first battery 10 alone can ensure that the voltage difference between the first battery voltage VBt1 and the second battery voltage VBt2 is within the tolerance that is represented by the threshold Vth. In contrast, in the electric power supply apparatus 100B according to this embodiment, the first battery 10 can be disconnected from the first electric power supply line PL1 by the second connection switch 72. Accordingly, the charging of the first battery 10, the charging of the second battery 20, the discharging of the first battery 10, and the discharging of the second battery 20 can be executed independently of each other in accordance with the combination of the opening and closing of the first connection switch 70 and the second connection switch 72. In this manner, the voltage difference between the first battery voltage VBt1 and the second battery voltage VBt2 can be within the tolerance that is represented by the threshold Vth not only by the rise in the first battery voltage VBt1 that is attributable to the charging of the first battery 10 and the lowering of the first battery voltage VBt1 that is attributable to the discharging of the first battery 10 but also by the rise in the second battery voltage VBt2 that is attributable to the charging of the second battery 20 and the lowering of the second battery voltage VBt2 that is attributable to the discharging of the second battery 20. Accordingly, compared to the electric power supply apparatus 100 according to the first to third embodiments, the electric power supply apparatus 100B according to this embodiment has a higher degree of freedom in allowing the voltage difference between the first battery voltage VBt1 and the second battery voltage VBt2 to be within the tolerance that is represented by the threshold Vth in a case where the parallel connection is performed from the state where the first battery 10 and the second battery 20 are separated from each other. Accordingly, even in this embodiment, one of the first battery 10 and the second battery 20 can be charged or discharged so that the difference (absolute value) between the first battery voltage VBt1 and the second battery voltage VBt2 becomes equal to or less than the threshold Vth and the first battery 10 and the second battery 20 are connected in parallel to each other in a case where the parallel connection is performed from the separation state where the parallel connection between the first battery 10 and the second battery 20 is cancelled. Accordingly, it is possible to suppress the electric energy loss attributable to the inter-battery output voltage difference during the parallel connection between the two batteries. Accordingly, even in this embodiment, it is possible to perform the parallel connection while suppressing the electric energy loss and the voltage variation with ease and without using any converter according to the related art, and thus the apparatus can become simplified, compact, and inexpensive. The invention is not limited to the embodiments, examples, and modification examples that are described in this specification, and can be realized in various configurations without departing from the scope of the invention. For example, the technical characteristics of the embodiments, examples, and modification examples that correspond to the technical characteristics of the respective aspects that are described in the SUMMARY OF THE INVENTION can be appropriately replaced and combined in order to partially or completely address the object described above or to partially or completely achieve the effect described above. The technical characteristics can be appropriately deleted unless described as essential in this specification. Refer to the followings as the examples.

In each of the embodiments described above, a case where the two batteries are connected in parallel to each other in the electric power supply apparatus that has the two batteries has been described as an embodiment. However, a configuration is also possible in which a parallel connection between a plurality of batteries is controlled in an electric power supply apparatus that has the plurality of, three or more, batteries. For example, the electric power supply apparatus that has the three batteries may be the electric power supply apparatus illustrated in FIGS. 1 and 13 that is configured to be further provided with a third auxiliary machine group which is directly connected to a third electric power supply line, a third battery which is connected to the third electric power supply line via a protection switch, and a third connection switch which connects the third electric power supply line and the first electric power supply line PL1 to each other. For example, the voltages of the respective batteries may be compared to each other, two at a time, and voltage adjustment by the charging of the battery which is determined to have a lower voltage or the discharging of the battery which is determined to have a higher voltage may be sequentially performed so that the parallel connection is controlled to be performed in a case where the output voltage difference between the plurality of batteries becomes equal to or less than a previously-determined threshold. In addition, voltage adjustment by the charging of a battery which is determined to have the lowest voltage among the three batteries or the discharging of a battery which is determined to have the highest voltage among the three batteries may be sequentially performed.

In the embodiments described above, an electric power supply control device that controls connection between the plurality of electric power supplies of the electric power supply apparatus mounted on the car using the gasoline engine as the power source and having the electric power supply apparatus mounted thereon has been described. However, the invention may be applied to other types of cars (for example, hybrid car, electric car, and fuel cell vehicle) and may be applied to other transportation equipment (for example, two-wheeled vehicle, electric train, and the like). In addition, the invention may be applied to apparatuses for controlling electric power supplies (for example, electric power generation apparatus) other than the transportation equipment.

What is claimed is:

1. An electric power supply control device for an electric power supply apparatus including a plurality of storage batteries and an electric power generator performing charging of the plurality of storage batteries, the electric power supply control device controlling a parallel connection between the plurality of storage batteries, comprising:

a voltage comparison unit performing comparison between output voltages of the plurality of storage batteries;

a voltage adjustment unit performing voltage adjustment by one of a) charging processing by electric power feeding from the electric power generator to the storage battery having the lowest output voltage among the plurality of storage batteries subject to the comparison by the voltage comparison unit and b) discharging processing by electric power feeding from the storage battery having the highest output voltage among the plurality of storage batteries subject to the comparison by the voltage comparison unit to a load circuit connected to the storage battery having the highest output voltage; and a connection processing unit performing the parallel connection in a case where output voltage difference between the plurality of storage batteries becomes equal to or less than a previously-determined threshold as a result of the voltage adjustment by the voltage adjustment unit, wherein the plurality of storage batteries include a first storage battery directly connected to the electric power generator and a second storage battery connected in parallel to the first storage battery via a connection switch, wherein the voltage adjustment unit performs the voltage adjustment by the charging processing for the first storage battery with the electric power generator in an electric power generation state in a case where the output voltage of the second storage battery exceeds the output voltage of the first storage battery, wherein the voltage adjustment unit performs the voltage adjustment by the discharging processing for the first storage battery with the electric power generator in a non-electric power generation state in a case where the output voltage of the first storage battery exceeds the output voltage of the second storage battery, and wherein the connection processing unit performs a parallel connection between the first storage battery and the second storage battery by closing the connection switch in a case where the output voltage difference between the first storage battery and the second storage battery becomes equal to or less than the threshold.

2. The electric power supply control device according to claim 1, wherein the first storage battery is connected, directly or via a first connection switch, to a first electric power supply line to which a first auxiliary machine group is connected; and the second storage battery is connected, via a second connection switch, to a second electric power supply line to which a second auxiliary machine group is connected, and wherein the first electric power supply line and the second electric power supply line are connected to each other via a third connection switch.

3. The electric power supply control device according to claim 2, wherein the first storage battery is connected, via the first connection switch, to the first electric power supply line to which the first auxiliary machine group is connected.

4. The electric power supply control device according to claim 1, wherein the voltage comparison unit performs the comparison between the output voltages of the plurality of storage batteries in a case where an execution request for the parallel connection is made, the voltage adjustment unit performs the voltage adjustment based on the result of the comparison, and the connection processing unit controls the parallel connection based on the result of the voltage adjustment.

5. The electric power supply control device according to claim 1, wherein the voltage comparison unit performs the comparison between the output voltages of the plurality of storage batteries, the voltage adjustment unit performs the voltage adjustment based on the result of the comparison, and the connection processing unit controls the parallel connection based on the result of the voltage adjustment in a case where an execution request for the parallel connection is made after the voltage adjustment.

6. The electric power supply control device according to claim 1, wherein the voltage adjustment unit performs the voltage adjustment by the charging processing for the first storage battery by changing the state of the electric power generator into the electric power generation state when the electric power generator is in the non-electric power generation state in a case where the output voltage of the second storage battery exceeds the output voltage of the first storage battery, and wherein the voltage adjustment unit performs the voltage adjustment by the discharging processing for the first storage battery by changing the state of the electric power generator into the non-electric power generation state when the electric power generator is in the electric power generation state in a case where the output voltage of the first storage battery exceeds the output voltage of the second storage battery.

7. A electric power supply control method for an electric power supply apparatus including a plurality of storage batteries and an electric power generator performing charging of the plurality of storage batteries, the electric power supply control method being for controlling a parallel connection between the plurality of storage batteries, comprising:

comparing output voltages of the plurality of storage batteries to each other;

performing voltage adjustment by one of a) charging processing by electric power feeding from the electric power generator to the storage battery having the lowest output voltage among the plurality of storage batteries subject to comparison in the comparing and b) discharging processing by electric power feeding from the storage battery having the highest output voltage among the plurality of storage batteries subject to the comparison in the comparing to a load circuit connected to the storage battery having the highest output voltage; and performing the parallel connection in a case where output voltage difference between the plurality of storage batteries becomes equal to or less than a previously-determined threshold as a result of the voltage adjustment, wherein the plurality of storage batteries include a first storage battery directly connected to the electric power generator and a second storage battery connected in parallel to the first storage battery via a connection switch, wherein the voltage adjustment is performed by the charging processing for the first storage battery with the electric power generator in an electric power generation state in a case where the output voltage of the second storage battery exceeds the output voltage of the first storage battery, wherein the voltage adjustment is performed by the discharging processing for the first storage battery with the electric power generator in a non-electric power generation state in a case where the output voltage of the first storage battery exceeds the output voltage of the second storage battery, and wherein the parallel connection between the first storage battery and the second storage battery is performed by closing the connection switch in a case where the output voltage difference between the first storage battery and the second storage battery becomes equal to or less than the threshold.

* * * * *